United States Patent
Raby

[19]

[11] Patent Number: 6,119,355
[45] Date of Patent: Sep. 19, 2000

[54] AUDIBLE TILT SENSOR CALIBRATION

[75] Inventor: Peter Raby, London, United Kingdom

[73] Assignee: Trimble Navigation Limited, Sunnyvale, Calif.

[21] Appl. No.: 09/089,055

[22] Filed: Jun. 2, 1998

[51] Int. Cl.[7] .................................................. G01C 5/00
[52] U.S. Cl. ........................................... 33/291; 33/1 PT
[58] Field of Search .................................. 33/1 PT, 1 N, 33/290, 291, 292, 293, 366.27

[56] References Cited

U.S. PATENT DOCUMENTS

| 4,942,668 | 7/1990 | Franklin | 33/1 PT |
|---|---|---|---|
| 5,301,434 | 4/1994 | Imaizumi | 33/1 PT |
| 5,421,096 | 6/1995 | Ross | 33/290 |
| 5,488,779 | 2/1996 | Schultheis et al. | 33/366.27 |
| 5,606,802 | 3/1997 | Ogawa | 33/291 |
| 5,711,080 | 1/1998 | Yamada | 33/292 |
| 5,819,424 | 10/1998 | Ohtomo et al. | 33/286 |
| 5,907,907 | 6/1999 | Ohtomo et al. | 33/286 |
| 5,983,511 | 11/1999 | Osaragi et al. | 33/291 |

*Primary Examiner*—G. Bradley Bennett
*Attorney, Agent, or Firm*—Wagner, Marabito & Hao LLP

[57] ABSTRACT

An audible signal generator incorporated into a total station to audibly indicate to the user the rotational orientation of the total station, and a method for using the audible indication to perform the tilt sensor calibration. In one embodiment, the present invention indicates to the user of the total station when the tilt sensor has been calibrated with the total station in a first rotational orientation. This embodiment then audibly indicates to the user when the rotational alidade portion of the total station has been rotated to a second rotational orientation. This embodiment then audibly indicates to the user when the tilt sensor has been calibrated with the total station in the second rotational orientation.

21 Claims, 9 Drawing Sheets

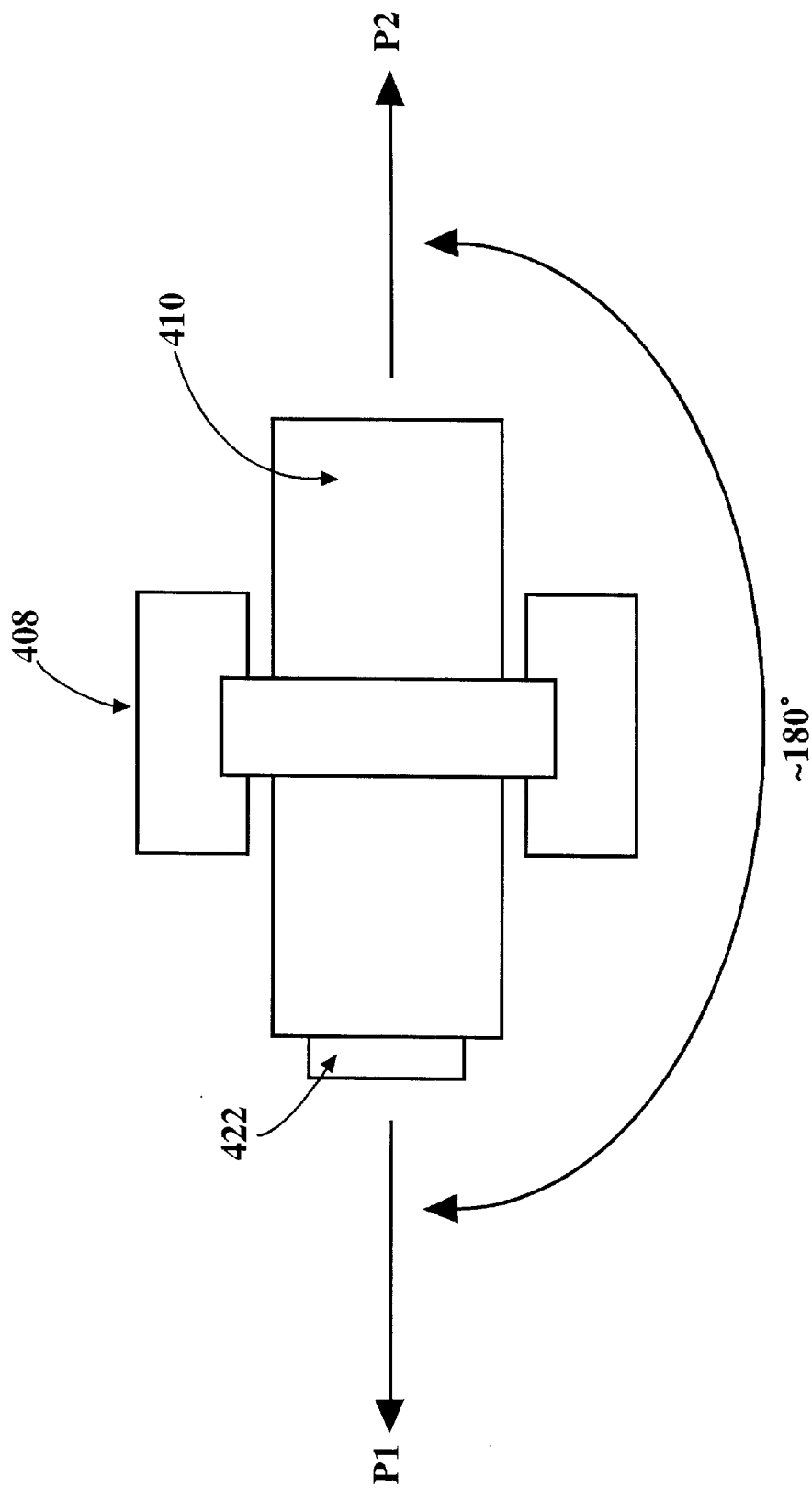

AUDIBLE TILT SENSOR CALIBRATION

TECHNICAL FIELD

The present invention relates to survey instrumentation. In particular, the present invention pertains to a total station.

BACKGROUND ART

Survey instruments such as total stations are commonly used to map construction sites, record terrain features, measure land parcels, and the like. These types of measurements require a high degree of accuracy, with acceptable tolerances measured in arc-seconds for angles and millimeters for distance. In addition to the demand for precision, it is also important that these instruments be easy and convenient to use, because of the difficult terrain and other extreme conditions that may be present in the location where the total station is to be employed.

When using a total station, it is necessary for the user to precisely level the instrument within a given required tolerance band before measurements are taken. In the prior art, electronic tilt sensors are a well-known and commonly used means of establishing whether the total station, in particular the rotational alidade portion of the total station, is level. The tilt sensors are typically integrated into the total station, and the data from the tilt sensors are visually displayed to the user on a screen present on the total station.

An electronic tilt sensor is comprised of a vial filled with fluid. Electrodes in the vial determine the electrical resistance of the fluid within the vial. By measuring the change in electrical resistance, the tilt sensors provide an indication of the amount of tilt of the vial and the total station to which the vial is attached. The amount of tilt is measured in arc-seconds. Typical electronic tilt sensors are capable of measurements within one (1) arc-second of angle.

The electrical resistance of the fluid within the tilt sensor is affected by the ambient conditions, particularly the temperature of the environment where the total station is being used. Thus, a bias of unknown quantity may be introduced into the level measurement provided by the tilt sensors if the temperature at the survey site is significantly different from the temperature used to calibrate the tilt sensors. There may also be biases introduced due to other factors. Because of the demand for precision, it is necessary to quantify the total bias in the tilt sensors and account for it when the rotational alidade portion is leveled. To account for the ambient effects, the tilt sensors are calibrated at the site where the total station will be used.

The measurement of tilt bias is generally determined by noting departure from local horizontal. The orientation, or direction of the tilt relative to some arbitrary reference angle such as true north, is also important to determine. As the rotational alidade portion rotates about its vertical axis, the degree of tilt varies from +θ to −θ and passes through zero degrees.

The bias in the tilt sensors is quantified using a known procedure. Once the bias is known, the tilt sensors can be calibrated to account for the bias. The known procedure involves measuring the angle of tilt twice. After the total station is set up, the rotational alidade portion is set at an initial rotational orientation and the angle of tilt is measured. The rotational alidade portion is then rotated approximately 180 degrees from its initial position and a second measurement of the angle of tilt is taken. Because the rotational alidade portion rotates in a fixed plane, the average of the values of the two measurements provides the true angle of tilt of the tilt sensors. If the sensors are perfectly level with respect to the bearings in the base of the rotational alidade portion, then the average of the two measurements will be zero, provided the instrument is level within the range of the sensors. The tilt sensors are thus calibrated to eliminate the bias. The rotational alidade portion is then leveled according to the true angle of tilt, and the bias is known if subsequently needed.

With reference to Prior Art FIGS. 1A and 1B, the technique for calibrating tilt sensors is illustrated for a total station equipped with a single screen. With reference first to Prior Art FIG. 1A, total station 100 is set up with rotational alidade portion 108 in an initial rotational orientation. Total station user 104 is in a position such that he or she can see screen 122. User 104 takes the first measurement of the angle of tilt using the tilt sensors (not shown), and confirms that the first tilt measurement is complete by using the visual display provided by screen 122.

With reference now to Prior Art FIG. 1B, user 104 rotates rotational alidade portion 108 to a second rotational orientation approximately 180 degrees from the initial position in order to take the second tilt measurement. User 104 also moves to a second position approximately 180 degrees from his or her initial position to confirm that rotational alidade portion 108 is rotated by the proper amount, to view screen 122, to initiate the second tilt measurement, and to determine when the second tilt measurement is properly completed. User 104 then rotates rotational alidade portion 108 one more time, back to its initial position, and also moves back to his or her initial position, in order to begin using the tilt station for the desired survey measurements.

As the discussion in the preceding paragraph shows, one of the disadvantages to prior art total stations equipped with only a single screen is the inconvenience to the user caused by the need for the user to move. Such movement by user 104 is necessitated by the rotation of the rotational alidade portion, so that user 104 can view screen 122 and successfully complete the tilt sensor calibration procedure.

With reference now to Prior Art FIG. 2, another disadvantage of prior art total stations equipped with only a single screen is illustrated. It is not uncommon for such total stations to be utilized in difficult terrain, such as hillsides, gullies, and the like. With reference to FIG. 2, user 204 is required to use total station 100 very near to the edge of embankment 209. Due to embankment 209 and the sloping surrounding terrain, user 204 is not able to move to second position 207 required to view screen 122 for the second tilt measurement. Thus, another disadvantage to prior art total stations equipped with only a single screen is that it is not always possible or convenient for the user to move to a second position, such as position 207, in order to view the screen and successfully complete the tilt sensor calibration procedure.

With reference now to Prior Art FIG. 3A, a prior art total station using two screens is demonstrated. Total station 300 is set up with rotational alidade portion 308 in an initial position. User 306 is positioned so that he or she can use screen 322. User 306 performs the first tilt measurement using the tilt sensors (not shown) with rotational alidade portion 308 in its initial orientation, and confirms that the first tilt measurement is complete using the visual display provided by screen 322. With reference now to FIG. 3B, user 306 rotates rotational alidade portion 308 to a second rotational orientation approximately 180 degrees from its first orientation in order to perform the second tilt measurement. In this embodiment of the prior art, user 306 does not need to move in conjunction with rotational alidade portion 308. Instead, user 306 uses screen 324 to perform the second tilt measurement. Unfortunately, a disadvantage of the two-screen total station design is that the addition of the second screen introduces additional production and maintenance costs that make a total station thus equipped more expensive than an otherwise comparably equipped single-screen total station.

Therefore, a need exists for a total station that combines the convenience of a two-screen station with the cost-effectiveness of a single-screen station. A further need exists for a total station which meets these needs and which is user-friendly, automatic, and compatible with the current practices and training of those currently using total stations.

DISCLOSURE OF THE INVENTION

The present invention provides a total station that combines the convenience of a two-screen total station with the cost-effectiveness of a single-screen total station. The present invention further provides a total station which achieves the above and which is user-friendly, automatic, and compatible with the current practices and training of those currently using total stations. The invention described herein incorporates an audible signal generator into a total station to audibly indicate the rotational orientation of the rotational alidade portion to the user. In addition, the invention described herein provides a method for using the audible indication to perform the tilt sensor calibration.

Specifically, in one embodiment, the present invention indicates to the user of the total station when the tilt sensor has been calibrated with the rotational alidade portion of the total station in a first rotational orientation. This embodiment then audibly indicates to the user when the rotational alidade portion of the total station has been rotated to a second rotational orientation. In this embodiment, the audible indication occurs when the rotational alidade portion of the total station is in a second rotational orientation approximately 180 degrees of rotation from the first rotational orientation. This embodiment then audibly indicates to the user when the tilt sensor has been calibrated with the total station in the second rotational orientation.

In another embodiment, the present invention includes the steps of the first embodiment described above, and further recites varying the audible signal to indicate the amount of rotation of the rotational alidade portion. In one such embodiment, the frequency of the audible signal is varied as a function of the amount of rotation of the rotational alidade portion.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is a top view of a total station indicating two rotational orientations for calibrating tilt sensors in accordance with one embodiment of the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 4:
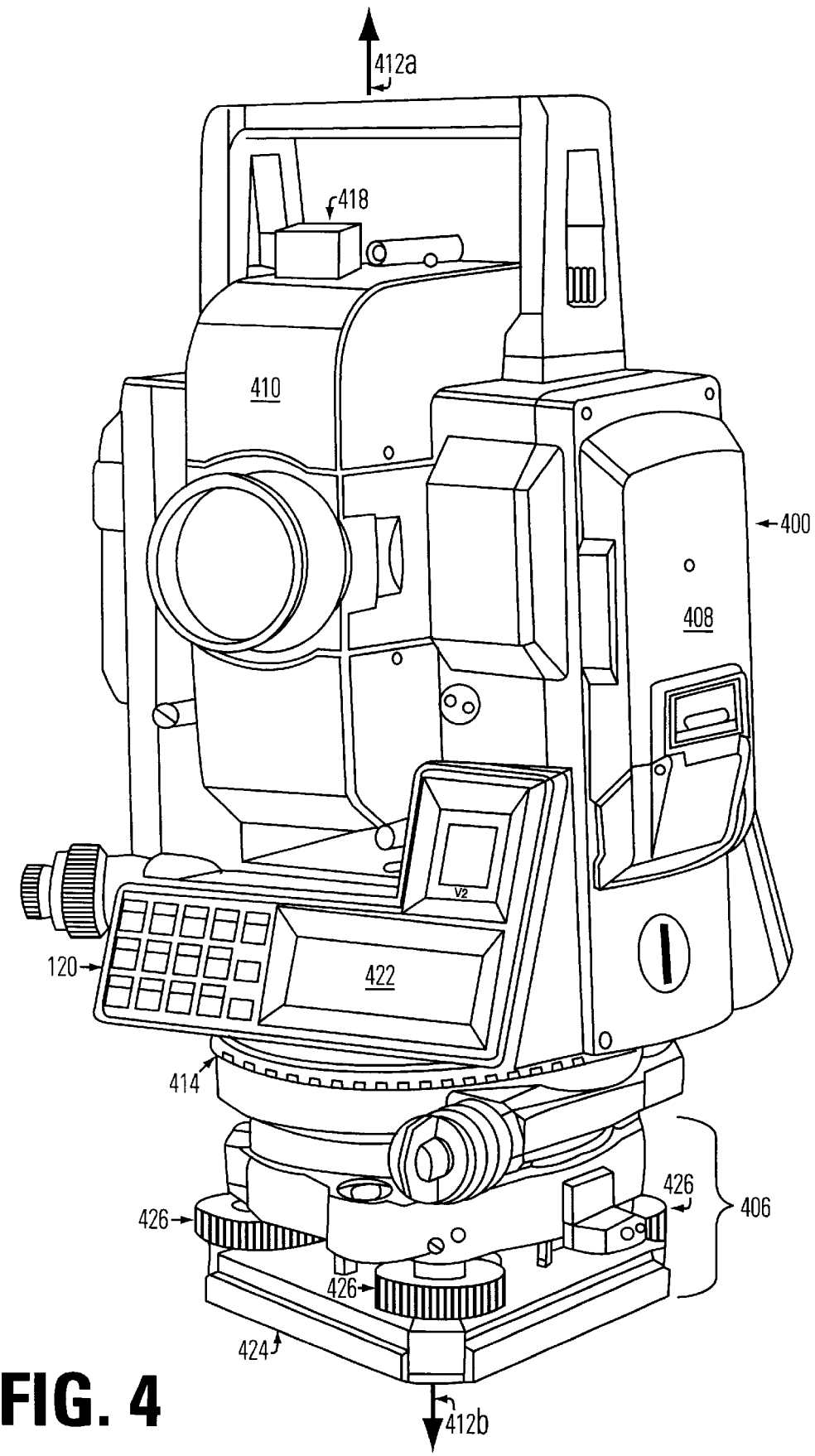
FIG. 4 is a perspective view of a total station in accordance with one embodiment of the present invention.

With reference now to FIG. 4, a perspective view of one embodiment of a total station used in accordance with the present invention is shown. Total station 400 is comprised of base portion 406, rotational alidade portion 408, and electronic distance measuring portion 410. Rotational alidade portion 408 is adapted to rotate on base portion 406 about a centrally located vertical axis represented by arrows 412a and 412b. That is, rotational alidade portion 408 is able to rotate 360 degrees on base 406. Rotational alidade portion 408 rotates in a plane on bearings 414.

Electronic distance measuring portion 410 is adapted to swivel upwards or downwards within rotational alidade portion 408. In so doing, it is possible to aim electronic distance measuring portion 410 toward a wide variety of elevations and in any of the 360 degrees through which rotational alidade portion 408 can be rotated.

In the present invention, total station 400 is equipped with an audible signal generator. In the present embodiment, audible signal generator 418 is mounted on rotational alidade portion 408.

With reference still to FIG. 4, keyboard 420 and screen 422 are employed by the user to input commands and to communicate with total station 400. In the present embodiment, only a single combination of keyboard 420 and screen 422 is used and is located on only a single face of rotational alidade portion 408.

With continued reference to FIG. 4, in the present embodiment rotational alidade portion 408 is mounted on top of a tripod (not shown) by means of tribrach 424. Tribrach 424 is attached to the tripod, and rotational alidade portion 408 is then locked into the tribrach. The present embodiment utilizes electronic tilt sensors (not shown) to determine whether total station 400, in particular rotational alidade portion 408, is level. In this embodiment, foot screws 426 provide fine motion control and are adjusted by the user until the readouts from the electronic tilt sensors indicate that total station 400, specifically rotational alidade portion 408, is level.

The electronic tilt sensors are calibrated to account for measurement bias introduced by the temperature of the environment and other such effects. In this embodiment of the present invention, the tilt sensors are calibrated using a Prior Art procedure. In essence, the technique involves two measurements of the angle of tilt of rotational alidade portion 408, with the second measurement taken after rotational alidade portion 408 is rotated approximately 180 degrees from the position of the first measurement.

Figure 1A:
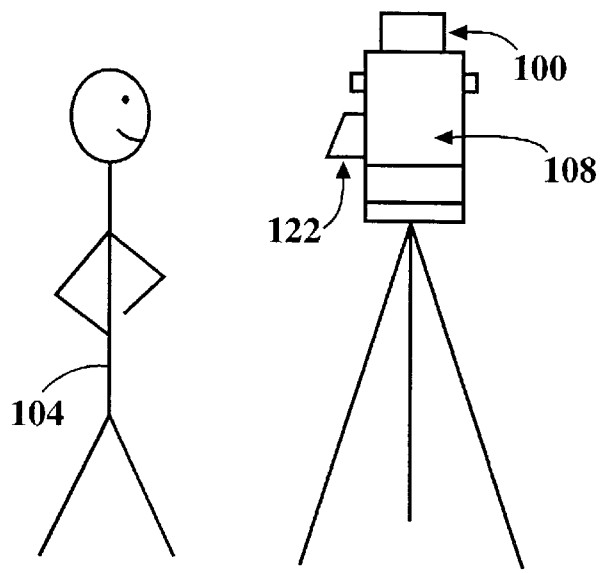
FIGS. 1A and 1B are illustrations of a Prior Art method used to calibrate tilt sensors.
Figure 1B:
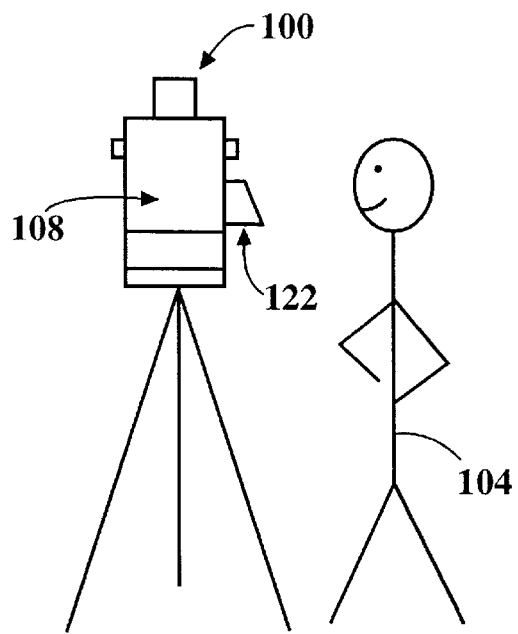
Figure 2:
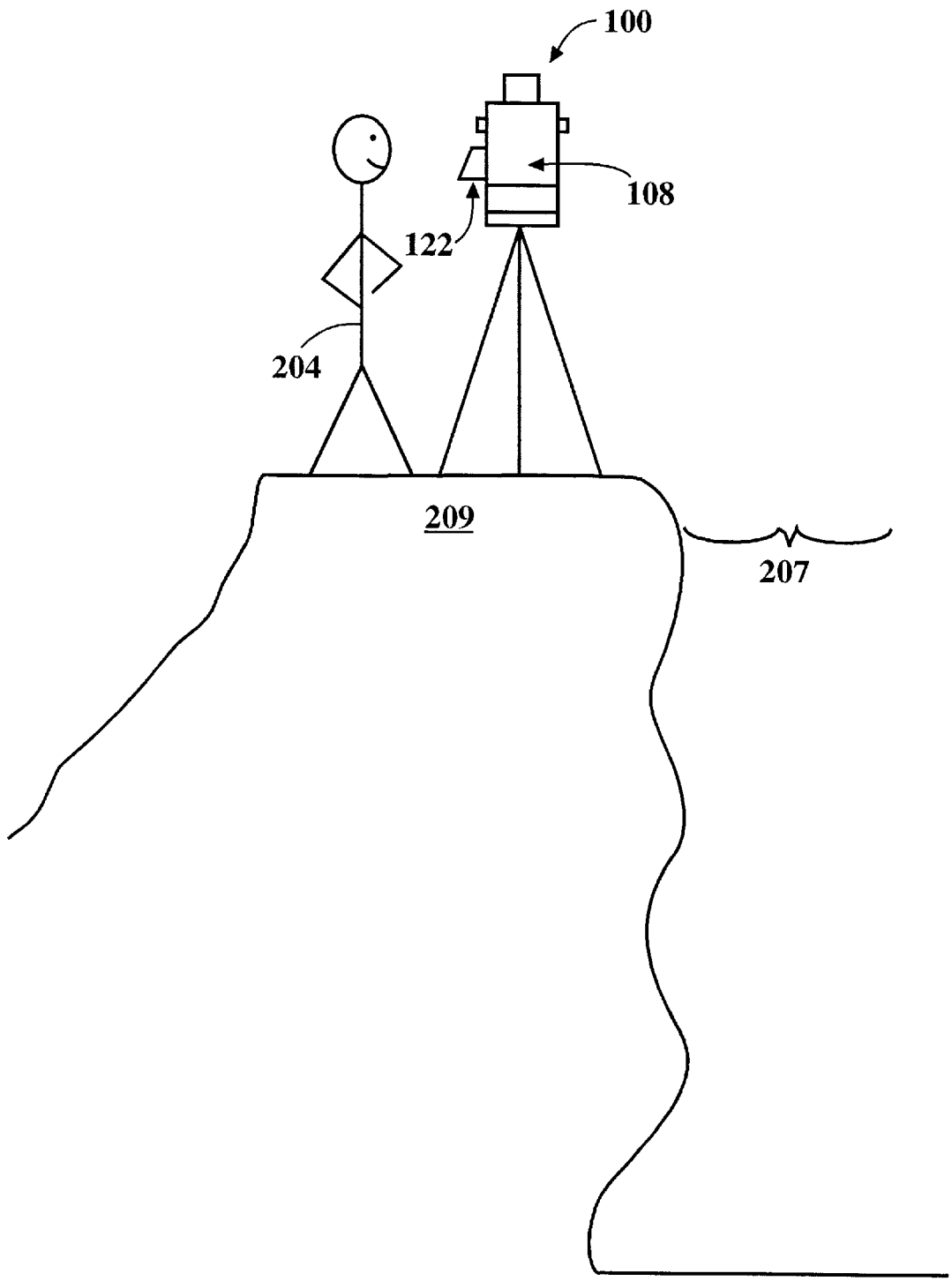
FIG. 2 is an illustration exemplifying deployment of a Prior Art total station.
Figure 3A:
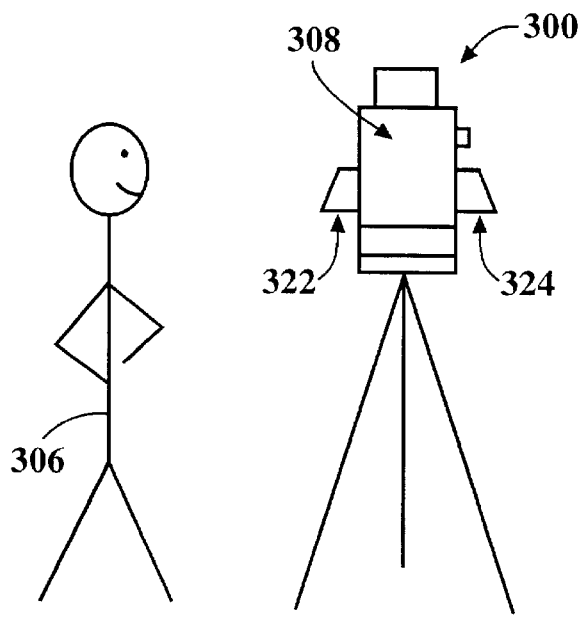
FIGS. 3A and 3B are illustrations of a Prior Art method used to calibrate tilt sensors in one embodiment of a total station.
Figure 3B:
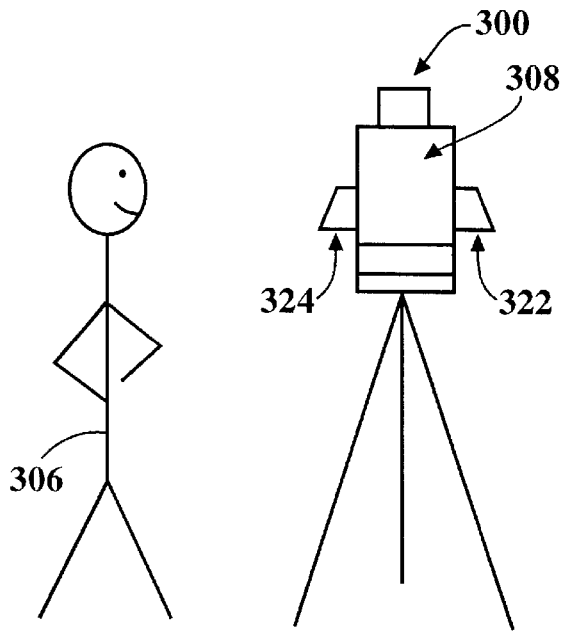

With reference still to FIG. 4, in the present embodiment the tilt sensor calibration is performed utilizing a single keyboard 420 and screen 422 located on one face of rotational alidade portion 408. (Performance of a calibration process in accordance with one embodiment of the present invention is set forth in detail below.) The present embodiment further employs audible signals emitted by audible signal generator 418. The audible signals are readily detectable by the user. In the present embodiment, an audible signal is used to indicate when the rotational alidade portion 408 is in the proper rotational orientation for each required calibration measurement. In this embodiment, an audible signal is also used to indicate when each calibration measurement is completed. Also in this embodiment, an audible signal indicates the azimuthal position of rotational alidade portion 408. Thus, unlike prior art methods such as those described above in conjunction with Prior Art FIGS. 3A and 3B, the present embodiment requires only a single keyboard and screen, because the user can audibly determine when each step of the calibration is complete instead of having to do so visually. Hence, the present embodiment also does not inconvenience the user as described above in conjunction with Prior Art FIGS. 1A and 1B. The present embodiment thus incorporates a cost-effective and user-friendly interface to allow the user to quickly and accurately accomplish a tilt calibration procedure.

Figure 6A:
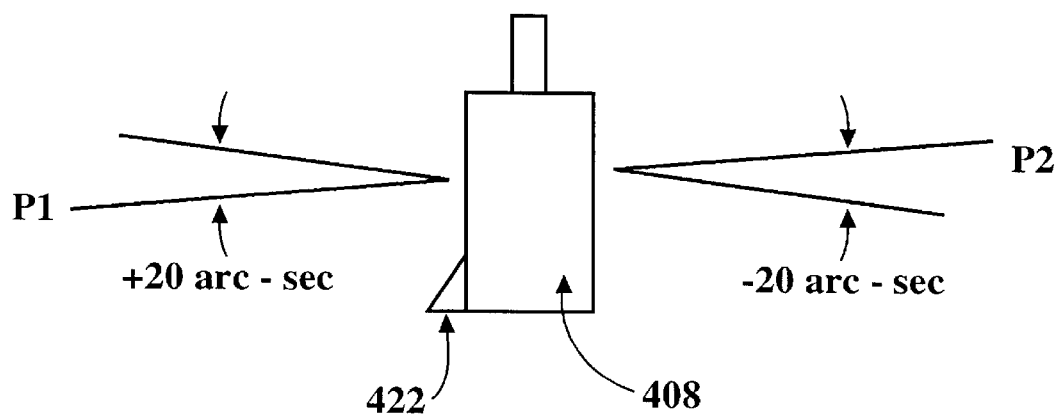
FIGS. 6A and 6B are examples of a method for calibrating tilt sensors in a total station in accordance with one embodiment of the present invention.
Figure 6B:
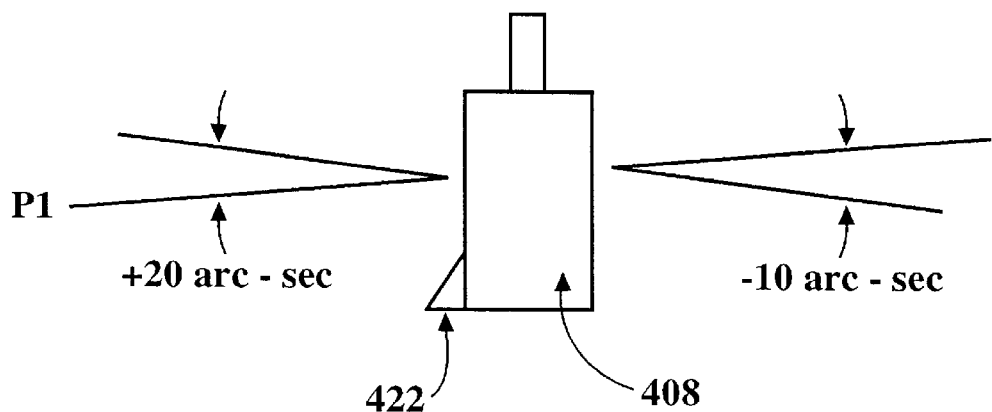

With reference now to FIGS. 5, 6A and 6B, a calibration procedure performed in accordance with one embodiment of the present invention is exemplified. With reference first to FIG. 5, rotational alidade portion 408 is in a first position P1 for the first tilt measurement using the tilt sensors. Rotational alidade portion 408 is then rotated approximately 180 degrees to a second position P2 for the second tilt measurement using the tilt sensors.

With reference now to FIG. 6A, an example in which the tilt sensors do not have a bias associated therewith is shown. In the example of FIG. 6A, the measurement with rotational alidade portion 408 at P1 indicates a tilt of +20 arc-seconds. The measurement with rotational alidade portion 408 at P2 indicates a tilt of −20 arc-seconds. Thus, the tilt measurement recorded at P1 is equal to and opposite of the tilt measurement at P2. Hence, such results demonstrate that the tilt sensors are properly calibrated and therefore do not introduce a bias to the level measurements. In such a case, rotational alidade portion 408 is tilted 20 arc-seconds and is adjusted until it is level.

With reference next to FIG. 6B, an example in which the tilt sensors do have a bias associated therewith is shown. In the example of FIG. 6B, at P1 the measurement indicates a tilt of +20 arc-seconds, while at P2 the measurement indicates a tilt of only −10 arc-seconds. In this case, the values of these measurements are averaged, and the average indicates that rotational alidade portion 408 is tilted 15 arc-seconds and that the electronic tilt sensors are introducing a bias of five (5) arc-seconds at P1 and P2. The user thus is able to quantify the bias associated with the tilt sensors, and adjust rotational alidade portion 408 by the appropriate amount (e.g., 15 arc-seconds) to make it level.

One familiar with the art will recognize that the above procedure represents one preferred method of performing the tilt sensor calibration and does not introduce additional sources of measurement error. The above procedure represents a current practice of those currently using total stations.

The present embodiment is also well suited for use with various types of tilt sensors that are calibrated using techniques other than this technique.

Figure 7A:
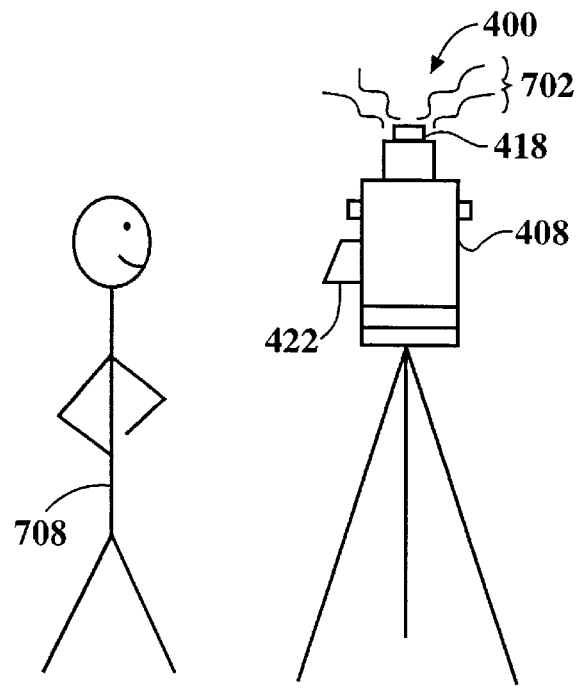
FIGS. 7A, 7B and 7C are illustrations of a method to calibrate tilt sensors in one embodiment of the present invention.

With reference now to FIG. 7A, an example of the present embodiment of the present invention in use is given. In this embodiment, total station 400 is equipped with audible signal generator 418. In the present embodiment, an audible signal, typically shown by 702, is sounded by audible signal generator 418 to indicate that the tilt sensors have been calibrated at the first rotational orientation. Audible signal 702 is readily detectable by user 708. However, it is appreciated that the type of signal used in conjunction with the calibration at the first rotational orientation can be different from audible signal 702. For example, with rotational alidade portion 408 in the first rotational orientation, it is possible for user 708 to view screen 422. In another embodiment of the present invention, the signal to indicate that the calibration at the first rotational orientation has been successfully taken is a visual indication displayed on screen 422.

Figure 7B:
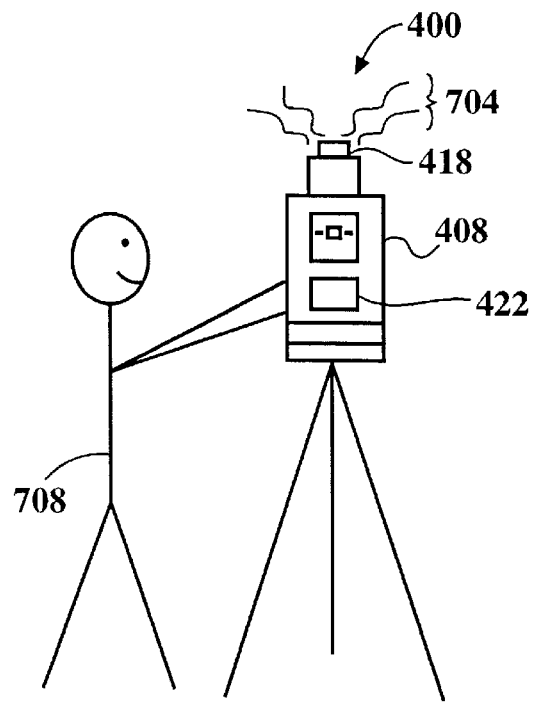

With reference now to FIG. 7B, in the present embodiment audible signal 704, different from audible signal 702, is used to indicate the position of rotational alidade portion 408 while it is being rotated 180 degrees in order to perform the second measurement needed for the tilt sensor calibration. Audible signal 704 is readily detectable by user 708. In the present embodiment, audible signal 704 is varied as a function of the degree of rotation experienced by rotational alidade portion 408. In the present embodiment, the period between occurrence of audible signal 704 decreases while rotational alidade portion 408 is rotated through the 180-degree arc from the first rotational orientation to the second rotational orientation. Thus, as rotational alidade portion 408 nears the second rotational orientation, the period between occurrence of audible signal 704 is at its least. Although the present embodiment uses the period between occurrence of audible signal 704 to indicate the degree of rotation of rotational alidade portion 408, it is appreciated that different means of varying audible signal 704 can be used to accomplish the same purpose. For example, in other embodiments, either the frequency or the volume of audible signal 704 can be increased or decreased as a function of the rotational orientation of rotational alidade 408.

In the present embodiment, audible signal 704 then ceases (i.e., becomes silent) as the means of providing an indication of when rotational alidade portion 408 is rotated to the proper orientation for the second calibration measurement, i.e., when rotational alidade portion 408 is in the 180-degree orientation relative to the first rotational orientation. However, it is appreciated that the type of signal used to indicate that rotational alidade portion 408 is rotated to the proper orientation for the second calibration measurement can be different from the signal used in the present embodiment and still be capable of accomplishing the same purpose. For example, in another embodiment, when rotational alidade portion 408 is in the rotational orientation for the second calibration measurement, a different easily distinguishable audible signal readily detectable by the user is sounded.

With reference still to FIG. 7B, in the present invention user 708 therefore establishes the proper orientation of rotational alidade portion 408 for the second tilt sensor calibration measurement by means of audible signal 704 as described above. As such, the user does not need to move around total station 400 in conjunction with the rotation of rotational alidade portion 408 in order to determine that it has reached the approximately 180-degree orientation needed for the second measurement. In this manner, the present embodiment of the present invention provides a convenient and user-friendly method for properly orienting the rotational alidade portion of a total station for the second calibration measurement while maintaining the cost-effectiveness associated with the use of a single screen.

Figure 7C:
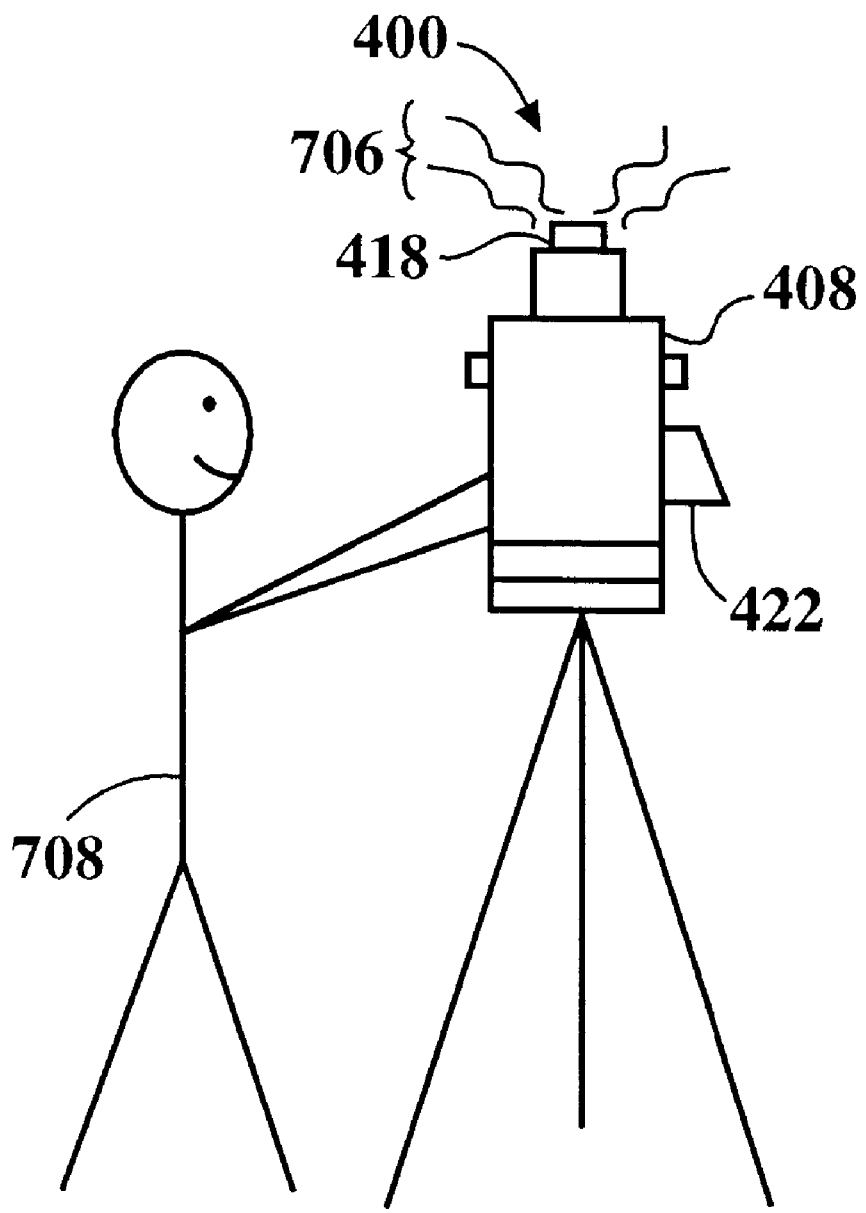

With reference now to FIG. 7C, once rotational alidade portion 408 is at the second rotational orientation, in the present embodiment the calibration of the tilt sensors at the second rotational orientation is obtained automatically by total station 400. After the calibration, the present embodiment then sounds audible signal 706, readily detectable by user 708, to indicate that the tilt sensors have been calibrated at the second rotational orientation. As such, user 708 does not need to move to the opposite side of total station 400 either to perform the second calibration measurement or to determine whether the second-calibration measurement has been obtained. Thus, the present embodiment provides a convenient and user-friendly method of obtaining the second calibration measurement while maintaining the cost-effectiveness associated with the use of a single screen.

The present embodiment then computes the center point of the tilt sensors by averaging the values of the two calibration measurements in the manner described above, and displays the results on screen 422. Upon rotating rotational alidade portion 408 back to its initial position, the user is able to read the screen and level rotational alidade portion 408 according to the displayed calibration results.

Figure 8:
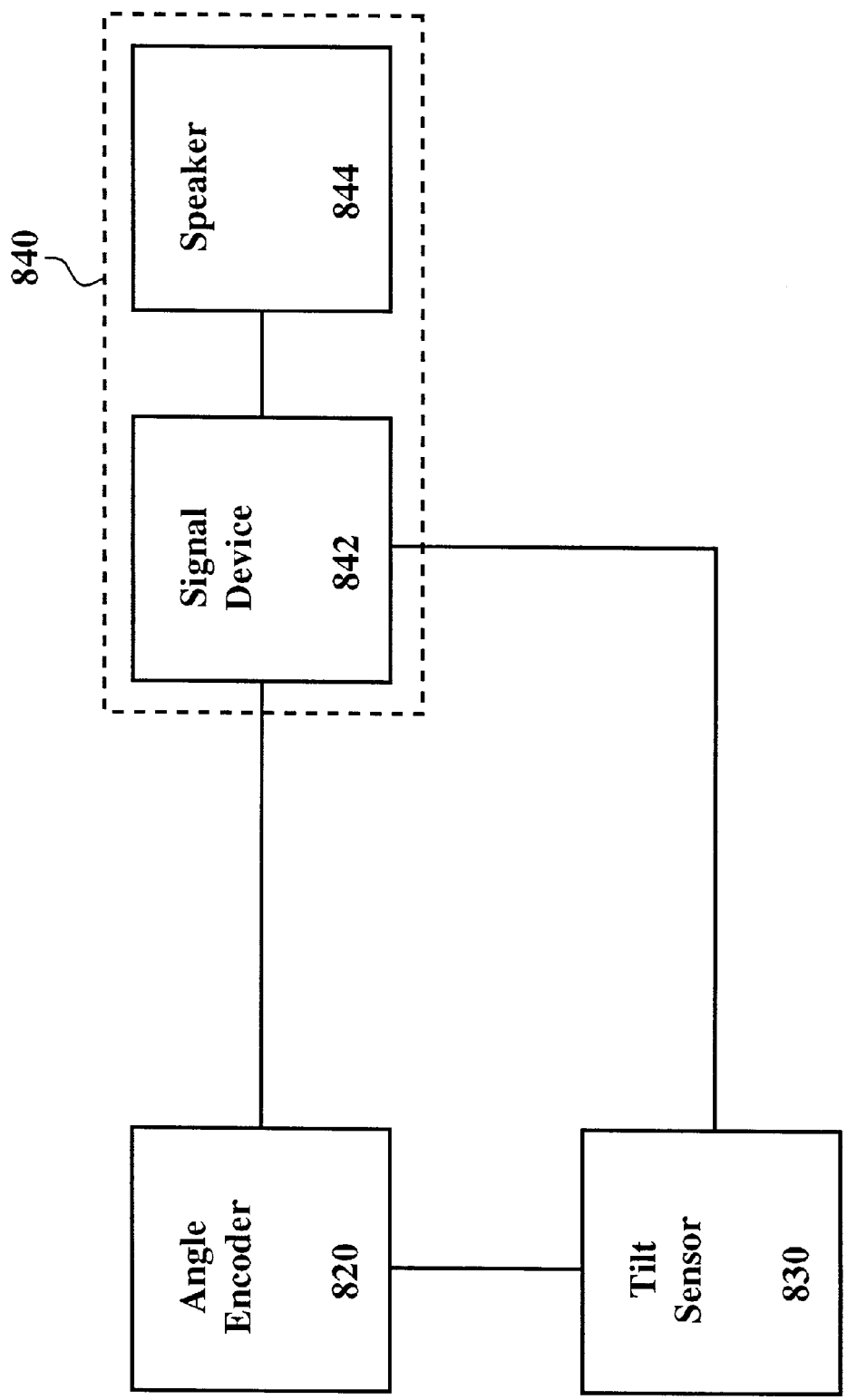
FIG. 8 is a block diagram of an audible tilt sensor in accordance with one embodiment of the present invention.

With reference now to FIG. 8, the audible tilt sensor in accordance with one embodiment of the present invention is diagrammed. In this embodiment, angle encoder 820 is coupled to tilt sensor 830 and audible signal generator 840. In this embodiment, angle encoder 820 is configured to electronically measure the azimuthal orientation of the rotational alidade portion (not shown). In this embodiment, audible signal generator 840 is comprised of signal device 842 and speaker 844, and is coupled to tilt sensor 830.

With reference still to FIG. 8, in this embodiment, with the rotational alidade portion in an initial orientation, angle encoder 820 determines the azimuthal position of the rotational alidade portion. The angle of tilt in the initial rotational orientation is measured using tilt sensor 830, and in one embodiment an audible signal is generated by audible signal generator 840 to indicate that the first calibration measurement is complete.

With continuing reference to FIG. 8, while the rotational alidade portion is being rotated 180 degrees in order to perform the second calibration measurement, audible signal generator 840 generates an audible signal that is varied as a function of the degree of rotation of the rotational alidade portion as described in conjunction with FIG. 7B. Angle encoder 820 indicates the amount of rotation a relative to the initial orientation of the rotational alidade portion. In one embodiment, the period between occurrence (i.e., the signal frequency) of the audible signal decreases while the rotational alidade portion is rotated through the 180-degree arc from the first rotational orientation to the second rotational orientation. Hence, in one embodiment, signal device 842 is coupled to angle encoder 820 and is configured to emit a signal according to the equation: Frequency (f)=constant (k)×amount of rotation (α); f=kα.

With reference still to FIG. 8, when rotational alidade portion is rotated to the position for the second calibration-measurement (e.g., when α=180 degrees), in one embodiment the audible signal from audible signal generator 840 ceases. After the second calibration measurement is complete, audible signal generator 840 emits a signal.

The present embodiment of the present invention is thereby utilized to perform tilt sensor calibrations using the technique commonly employed by current users of total stations. As such, the present embodiment is compatible with the current practices and training of those who currently use total stations. The present invention is also well-suited for use with other calibration procedures in which a rotational alidade portion of a total station is rotated and tilt measurements are taken at one or more orientations in order to determine the bias associated with tilt sensors, including procedures in which the tilt measurements are taken at orientations other than those located approximately 180 degrees from each other.

The present embodiment of the present invention, a total station incorporating audible tilt sensor calibration, is thus described. While the present invention has been described in particular embodiments, it should be appreciated that the present invention should not be construed as limited by such embodiments, but rather construed according to the following claims.

What is claimed is:

1. A measurement apparatus comprising:
   a total station having a centrally located vertical axis of rotation, said total station further comprising:
   a rotational alidade portion adapted to rotate about said vertical axis,
   an electronic distance measuring portion,
   a tilt sensor, and
   an audible signal generator adapted to audibly indicate information corresponding to a rotational orientation of said rotational alidade portion, wherein said audible signal generator is adapted to generate an audible signal when said rotational alidade portion is disposed in a second rotational orientation, said second rotational orientation a prescribed number of degrees of rotation from a first rotational orientation.

2. The measurement apparatus of claim 1 wherein said audible signal generator is adapted to generate an audible signal when said rotational alidade portion is disposed in a first rotational orientation and said tilt sensor has been calibrated at said first rotational orientation.

3. The measurement apparatus of claim 1 wherein said second rotational orientation of said rotational alidade portion is approximately 180 degrees of rotation from said first rotational orientation of said rotational alidade portion.

4. The measurement apparatus of claim 1 wherein said audible signal generator is adapted to generate an audible signal when said tilt sensor has been calibrated at said second rotational orientation.

5. The measurement apparatus of claim 1 wherein said audible signal generator is adapted to generate audible signals which vary to indicate degree of rotation of said rotational alidade portion.

6. The measurement apparatus of claim 5 wherein said audible signal generator is adapted to vary a period between occurrence of said audible signals, said period between occurrence corresponding to said degree of rotation of said rotational alidade portion.

7. The measurement apparatus of claim 5 wherein said audible signal generator is adapted to vary pitch of said audible signals, said pitch corresponding to said degree of rotation of said rotational alidade portion.

8. The measurement apparatus of claim 5 wherein said audible signal generator is adapted to vary volume of said audible signals, said volume corresponding to said degree of rotation of said rotational alidade portion.

9. A method for indicating when a rotational alidade portion of a total station is in a desired rotational orientation, said method comprising the steps of:
   a) audibly indicating when said rotational alidade portion of said total station has been rotated a prescribed number of degrees of rotation from said first rotational orientation to a second rotational orientation; and
   b) audibly indicating when said tilt sensor of said total station has been calibrated with said rotational alidade portion of said total station in said second rotational orientation.

10. The method as recited in claim 9 further comprising the step of:
   audibly indicating when said tilt sensor of said total station has been calibrated with said rotational alidade portion of said total station in said first rotational orientation.

11. The method as recited in claim 9 wherein said step a) comprises:
   audibly indicating when said rotational alidade portion of said total station has been rotated approximately 180 degrees of rotation from said first rotational orientation.

12. The method as recited in claim 9 wherein said step a) further comprises the step of:
   varying an audible signal to audibly indicate a degree of rotation of said rotational alidade portion.

13. The method as recited in claim 12 wherein said step a) further comprises the step of:
   varying a period between occurrence of said audible signal to audibly indicate said degree of rotation of said rotational alidade portion.

14. The method as recited in claim 12 wherein said step a) further comprises the step of:
   varying pitch of said audible signal to audibly indicate said degree of rotation of said rotational alidade portion.

15. The method as recited in claim 12 wherein said step a) further comprises the step of:
   varying volume of said audible signal to audibly indicate said degree of rotation of said rotational alidade portion.

16. A method for indicating when a rotational alidade portion of a total station is in a desired rotational orientation, said method comprising the steps of:
   a) audibly indicating when a tilt sensor of a total station has been calibrated with a rotational alidade portion of said total station in a first rotational orientation;
   b) audibly indicating a degree of rotation of said rotational alidade portion when said rotational alidade portion of said total station is being rotated to a second rotational orientation;
   c) audibly indicating when said rotational alidade portion of said total station has been rotated a prescribed number of degrees from said first rotational orientation to said second rotational orientation; and
   d) audibly indicating when said tilt sensor of said total station has been calibrated with said rotational alidade portion of said total station in said second rotational orientation.

17. The method as recited in claim 16 wherein said step b) further comprises the step of:
   varying an audible signal to audibly indicate a degree of rotation of said rotational alidade portion.

18. The method a s recited in claim 16 wherein said step b) further comprises the step of:
   varying a period between occurrence of said audible signal to audibly indicate said degree of rotation of said rotational alidade portion.

19. The method as recited in claim 16 wherein said step b) further comprises the step of:
   varying pitch of said audible signal to audibly indicate said degree of rotation of said rotational alidade portion.

20. The method as recited in claim 16 wherein said step b) further comprises the step of:
   varying volume of said audible signal to audibly indicate said degree of rotation of said rotational alidade portion.

21. The method as recited in claim 16 wherein said step c) comprises:
   audibly indicating when said rotational alidade portion of said total station has been rotated approximately 180 degrees of rotation from said first rotational orientation.

* * * * *